United States Patent Office 3,231,586
Patented Jan. 25, 1966

3,231,586
DIEPOXIDE COMPOSITIONS
Samuel W. Tinsley, South Charleston, W. Va., assignor to Union Carbide Corporation, a corporation of New York
No Drawing. Filed May 14, 1962, Ser. No. 194,664
14 Claims. (Cl. 260—340.6)

This invention relates to the preparation of various diepoxydioxanes described hereinafter. This invention also relates to the preparation of various diolefinic diether dioxanes described hereinafter. In one aspect, the invention relates to curable, polymerizable compositions comprising said diepoxydioxanes, a catalyst, and/or an active organic hardener. In various other aspects, the invention relates to the fusible thermosetting intermediate reaction products and to the cured, polymerized products which result from the aforementioned curable compositions.

The curable compositions of the invention can be readily handled in resin-forming operations such as coating, laminating, bonding, molding, casting, potting, and the like. These curable compositions are capable of accepting solid materials, such as fillers and pigments, for providing various effects in physical properties and coloration. With or without such added solid materials, the curable compositions can be made to fill small intricacies of molds without the necessity of applying high pressures or heating to high temperatures, although such measures can be employed, if desired. The curable compositions also can be easily spread, brushed, or sprayed by many techniques available in the paint, lacquer, and varnish industries for making coatings and finishes. They can be also advantageously employed in the potting of such fragile articles as electronic components.

The curable, polymerizable compositions of the invention also can be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of head and/or pressure. Numerous other uses, applications, and unexpected advantages and results will become apparent upon a consideration of the various embodiments of the invention which are discussed hereinafter.

Accordingly, one or more of the following objects will be achieved by the practice of the invention.

It is an object of the invention to prepare novel diepoxydioxanes described hereinafter. Another object of the invention is to prepare various novel diolefinic diether dioxanes which are the precursors or reagents employed in the production of the novel diepoxydioxanes. It is another object of the invention to prepare novel homopolymerized products of said diepoxydioxanes. It is, also, an object of the invention to prepare novel curable, partially cured, and cured compositions comprising a diepoxydioxane and an active organic hardener. It is another object of the invention to prepare novel curable, polymerizable compositions compising a diepoxydioxane, an active organic hardener, and a modifying amount of a different active organic compound to thereby impart special and desirable characteristics and properties to the ultimately, fully cured compositions. It is a further object of the invention to prepare novel curable compositions and partially cured compositions (fusible thermosetting intermediate reaction products) comprising a diepoxydioxane and an active organic hardener which compositions, when dissolved in an inert normally-liquid organic medium, are useful in the fields of coatings, laminates, adhesives, and the like. A still further object of the invention is to prepare novel fusible thermosetting intermediate reaction solid products resulting from the partial reaction of a composition comprising diepoxydioxane and an active organic hardener which products are useful as molding powder compositions. A yet further object of the invention is to provide novel curable and fully cured compositions comprising a diepoxydioxane, a polycarboxylic acid anhydride, and an ethylenically unsaturated organic compound. Another object of the invention is to provide novel and useful high molecular weight polymeric varnish compositions which result from the homopolymerization of the hydroxy- and epoxy-containing products prepared by the reaction of a diepoxydioxane and an aliphatic hydrocarbon monocarboxylic acid. It is also an object of the invention to prepare novel and useful high molecular weight polymeric varnish compositions which result from the esterification of fusible, soluble, polymeric polyhydric alcohols with organic fatty acids, said polymeric polyhydric alcohols being prepared by the reaction of a diepoxydioxane and a polyol. Numerous other objects of the present invention will become apparent to those skilled in the art from a consideration of the disclosure.

The novel diepoxydioxanes which are contemplated can be characterized by the following formula:

(I) 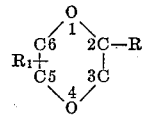

wherein R and $R_1$ can be (a) a vic-epoxyalkoxy radical in which the vic-epoxy group is at least one carbon atom removed from the oxy (—O—) group of said radical, (b) a vic-epoxycycloalkoxy radical in which the vic-epoxy group is at least one carbon atom removed from the oxy (—O—) group of said radical, (c) a vic-epoxycycloalkylalkoxy radical, (d) a 3-oxatricyclo[3.2.1.0$^{2,4}$]oct-6-oxy radical, (e) a 3-oxatricyclo[3.2.1.0$^{2,4}$]oct-6-ylalkoxy radical, (f) a 4-oxatetracyclo[6.2.1.0$^{2,7}$.0$^{3,5}$]undec-9-oxy radical, (g) a 4-oxatetracyclo[6.2.1.0$^{2,7}$.0$^{3,5}$]undec-9-oxyalkoxy radical, (h) a 10-oxapentacyclo[6.3.1.1$^{3,6}$.0$^{2,7}$.0$^{9,11}$]tridec-4-oxy radical, (i) a 10-oxapentacyclo[6.3.1.1$^{3,6}$.0$^{2,7}$.0$^{9,11}$]tridec-4-oxyalkoxy radical, and (j) a 10-oxapentacyclo[6.3.1.1$^{3,6}$.0$^{2,7}$.0$^{9,11}$]tridec-4-ylalkoxy radical;

with the proviso that the $R_1$ variable cannot be bonded to the carbon atom in the six position of the dioxane nucleus.

It should be noted at this time that the expression "vic-epoxy," as used herein including the appended claims, refers to the group

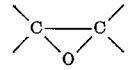

i.e., wherein the oxygen atom is bonded to vicinal carbon atoms. This term "vic-epoxy" is a recognized abbreviation for the expression "vicinal epoxy." The vic-epoxyalkoxy radical preferably contains up to 18 carbon atoms. The cycloaliphatic nucleus of the vic-epoxycycloalkoxy and vic-epoxycycloalkylalkoxy radicals preferably contain from 5 to 7 carbon atoms including the epoxy carbon atoms. In addition, the expression "lower alkyl," as used herein including the appended cliams, refers to a monovalent saturated aliphatic hydrocarbon radical which contains from 1 to 4 carbon atoms. Moreover, the "alkoxy" moiety (excluding the vic-epoxyalkoxy radical) of the R and $R_1$ variables illustrated supra with reference to the Formula I preferably contain up to 6 carbon atoms.

With reference to Formula I supra, illustrative R and $R_1$ variables include, for example, 2,3-epoxypropoxy,
2,3-epoxybutoxy,
2,3-epoxypentoxy,
2,3-epoxyhexoxy,
2,3-epoxyoctoxy,
4,5-epoxypentoxy,
3,4-epoxyheptoxy,
9,10-epoxyoctadecoxy,
2,3-epoxycyclopentoxy,
2,3-epoxycyclohexoxy,
2,3-epoxycyclopentoxy,
2,3-epoxycycloheptoxy,
3,4-epoxycyclohexoxy,
lower alkyl-2,3-epoxycyclopentoxy,
lower alkyl-3,4-epoxycyclohexoxy,
lower alkyl-3,4-epoxycycloheptoxy,
2,3-epoxycyclopentylmethoxy,
2,3-epoxycyclohexylmethoxy,
3,4-epoxycyclohexylmethoxy,
3,4-epoxycycloheptylmethoxy,
3,4-epoxycyclohexylethoxy,
3,4-epoxycyclohexyl-n-propoxy,
lower alkyl-3,4-epoxycyclohexylmethoxy,
3-oxatricyclo[3.2.1.0$^{2,4}$]oct-6-oxy,
7-methyl-3-oxatricyclo[3.2.1.0$^{2,4}$]oct-6-oxy,
7-ethyl-3-oxatricyclo[3.2.1.0$^{2,4}$]oct-6-oxy,
3-oxatricyclo[3.2.1.0$^{2,4}$]oct-6-ylmethoxy,
4-oxatetracyclo[6.2.1.0$^{2,7}$.0$^{3,5}$]undec-9-oxy,
methyl-4-oxatetracyclo[6.2.1.0$^{2,7}$.0$^{3,5}$]undec-9-oxy,
4-oxatetracyclo[6.2.1.0$^{2,7}$.0$^{3,5}$]undec-9-oxyethoxy,
4-oxatetracyclo[6.2.1.0$^{2,7}$.0$^{3.5}$]undec-9-oxy-n-propoxy,
10-oxapentacyclo[6.3.1.1$^{3,6}$.0$^{2,7}$.0$^{9,11}$]tridec-4-oxy,
10-oxapentacyclo[6.3.1.1$^{3,6}$.0$^{2,7}$.0$^{9,11}$]tridec-4-oxyethoxy,
10-oxapentacyclo[6.3.1.1$^{3,6}$.0$^{2,7}$.0$^{9,11}$]tridec-4-oxyisopropoxy,
10-oxapentacyclo[6.3.1.1$^{3,6}$.0$^{2,7}$.0$^{9,11}$]tridec-4-oxy-n-butoxy,
10-oxapentacyclo[6.3.1.1$^{3,6}$.0$^{2,7}$.0$^{9,11}$]tridec-4-ylmethoxy,
10-oxapentacyclo[6.3.2.1$^{3,6}$.0$^{2,7}$.0$^{9,11}$]tridec-4-ylethoxy,
10-oxapentacyclo[6.3.1.1$^{3,6}$.0$^{2,7}$.0$^{9,11}$]tridec-4-yl-t-butoxy, and the like.

Illustrative subclasses of novel diepoxydioxanes include, for instance, 2,3(5)-bis(vic-epoxyalkoxy)dioxane,
2,3(5)-bis(vic-epoxycycloalkoxy)dioxane,
2,3(5)-bis(vic-epoxycycloalkylalkoxy)dioxane,
2,3(5)-bis(3-oxatricyclo[3.2.1.0$^{2,4}$]oct-6-oxy)dioxane,
2,3(5)-bis(3-oxatricyclo[3.2.1.0$^{2,4}$]oct-6-ylalkoxy)dioxane,
2,3(5)-bis(4-oxatetracyclo[6.2.1.0$^{2,7}$.0$^{3,5}$]undec-9-oxy)dioxane,
2,3(5)-bis(4-oxatetracyclo[6.2.1.0$^{2,7}$.0$^{3,5}$]undec-9-oxyalkoxy)dioxane,
2,3(5)-bis(10-oxapentacyclo[6.3.1.1$^{3,6}$.0$^{2,7}$.0$^{9,11}$]-tridec-4-oxy)dioxane,
2,3(5)-bis(10-oxapentacyclo[6.3.1.1$^{3,6}$.0$^{2,7}$.0$^{9,11}$]tridec-4-oxyalkoxy)dioxane,
2,3(5)-bis(10-oxapentacyclo[6.3.1.1$^{3,6}$.0$^{2,9}$.0$^{9,11}$]tridec-4-ylalkoxy)dioxane, and the like.

Other subclasses of novel diepoxydioxanes include, in addition to the symmetrical diepoxydioxanes enumerated immediately above, the unsymmetrical diepoxydioxanes in which the R and $R_1$ variables (of Formula I) are different.

Specific examples of novel diepoxydioxanes include, by way of illustration, 2,3(5)-bis(2,3-epoxypropoxy)dioxane,
2,3(5)-bis(2,3-epoxybutoxy)dioxane,
2,3(5)-bis(2,3-epoxypentoxy)dioxane,
2,3(5)-bis(2,3-epoxyhexoxy)dioxane,
2,3(5)-bis(3,4-epoxyoctoxy)dioxane,
2,3(5)-bis(9,10-epoxyoctadecoxy)dioxane,
2,3(5)-bis(2,3-epoxyundecoxy)dioxane,
2,3(5)-bis(2,3-epoxycyclopentoxy)dioxane,
2,3(5)-bis(3,4-epoxycyclohexoxy)dioxane,
2,3(5)-bis(3,4-epoxycycloheptoxy)dioxane,
2,3(5)-bis(2,3-epoxycyclopentylmethoxy)dioxane,
2,3(5)-bis(2,3-epoxycyclopentylethoxy)dioxane,
2,3(5)-bis(3,4-epoxycyclohexylmethoxy)dioxane,
2,3(5)-bis(3,4-epoxycyclohexylethoxy)dioxane,
2,3(5)-bis(3,4-epoxycyclohexyl-n-propoxy)dioxane,
2,3(5)-bis(3,4-epoxycycloheptylmethoxy)dioxane,
2,3(5)-bis(3-oxatricyclo[3.2.1.0$^{2,4}$]oct-6-oxy)dioxane,
2,3(5)-bis(3-oxatricyclo[3.2.1.0$^{2,4}$]oct-6-ylmethoxy)dioxane,
2,3(5)-bis(3-oxatricyclo[3.2.1.0$^{2,4}$]oct-6-ylethoxy)dioxane,
2,3(5)-bis(3-oxatricyclo[3.2.1.0$^{2,4}$]oct-6-ylpropoxy)dioxane,
2,3(5)-bis(4-oxatetracyclo[6.2.1.0$^{2,7}$.0$^{3,5}$]undec-9-oxy)dioxane,
2,3(5)-bis(4-oxatetracyclo[6.2.1.0$^{2,7}$.0$^{3,5}$]undec-9-oxyethoxy)dioxane,
2,3(5)-bis(4-oxatetracyclo[6.2.1.0$^{2,7}$.0$^{3,5}$]undec-9-oxybutoxy)dioxane,
2,3(5)-bis(10-oxapentacyclo[6.3.1.1$^{3,6}$.0$^{2,7}$.0$^{9,11}$]tridec-4-oxy)dioxane,
2,3(5)-bis(10-oxapentacyclo[6.3.1.1$^{3,6}$.0$^{2,7}$.0$^{9,11}$]tridec-4-oxyethoxy)dioxane,
2,3(5)-bis(10-oxapentacyclo[6.3.1.1$^{3,6}$.0$^{2,7}$.0$^{9,11}$]tridec-4-oxy-n-propoxy)dioxane,
2,3(5)-bis(10-oxapentacyclo[6.3.1.1$^{3,6}$.0$^{2,7}$.0$^{9,11}$]tridec-4-ylmethoxy)dioxane,
2,3(5)-bis(10-oxapentacyclo[6.3.1.1$^{3,6}$.0$^{2,7}$.0$^{9,11}$]tridec-4-ylethoxy)dioxane,
2,3(5)-bis(10-oxapentacyclo[6.3.1.1$^{3,6}$.0$^{2,7}$.0$^{9,11}$]tridec-4-ylbutoxy)dioxane, and the like.

As indicated previously, the novel unsymmetrical diepoxydioxanes are also contemplated within the scope of the invention and various illustrative specific examples are readily apparent from the preceding discussion commencing with Formula I supra.

The novel diolefinic diether dioxanes which are contemplated can be characterized by the following formula:

(II)
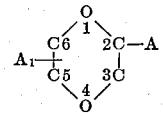

wherein A and $A_1$ can be (a) a cycloalkenyloxy radical in which the ethylenic group, i.e., $>C=C<$, is at least one carbon atom removed from the oxy (—O—) group of said radical, (b) a cycloalkenylalkoxy radical, (c) a bicyclo[2.2.1]hept-2-en-5-oxy radical, (d) a bicyclo[2.2.1]hept-2-en-5-ylalkoxy radical, (e) a tricyclo[5.2.1.0$^{2,6}$]dec-3-en-8-oxy radical, (f) a tricyclo[5.2.1.0$^{2,6}$]dec-3-en-8-oxyalkoxy radical, (g) a tetracyclo[6.2.1.1$^{3,6}$.0$^{2,7}$]dodec-9-en-4-oxy radical, (h) a tetracyclo[6.2.1.1$^{3,6}$.0$^{2,7}$]dodec-9-en-4-oxyalkoxy radical, and (i) a tetracyclo[6.2.1.1$^{3,6}$.0$^{2,7}$]dodec-9-en-4 - ylalkoxy radical; with the proviso that the $A_1$ variable cannot be bonded to the carbon atom in the six position of the dioxane nucleus.

With reference to Formula II supra, the cycloaliphatic nucleus of the cycloalkenyloxy and cycloalkenylalkoxy radicals preferably contain from 5 to 7 carbon atoms. The "alkoxy" moiety of the A and $A_1$ variables preferably contain up to 6 carbon atoms.

Illustrative A and $A_1$ variables include, by way of examples, 2-cyclopentenyloxy, 2-cyclohexenyloxy, 2-cycloheptenyloxy, 3-cyclohexenyloxy, lower alkyl-2-cyclopentenyloxy, lower alkyl-3-cyclohexenyloxy, lower alkyl-3-cycloheptenyloxy, 2-cyclopentenylmethoxy, 2-cyclohexenylmethoxy, 3-cyclohexenylmethoxy, 3-cycloheptenylmethoxy, 3-cyclohexenylethoxy, 3-cyclohexenyl-n-propoxy, lower alkyl-3-cyclohexenylmethoxy, bicyclo[2.2.1]hept-2-en-5-oxy, 6-methyl-bicyclo[2.2.1]hept-2-en-5-oxy, 6-ethyl-bicyclo[2.2.1]hept - 2 - en - 5 - oxy, bicyclo[2.2.1]hept - 2 - en - 5 - ylmethoxy, bicyclo[2.2.1]hept - 2-en-5 ylethoxy, tricyclo[5.2.1.0$^{2,6}$]dec-3-en-8-oxy, methyl-tricyclo[5.2.1.0$^{2,6}$]dec-3-en-8-oxy, tricyclo[5.2.1.0$^{2,6}$]dec - 3 - en-8 - oxyethoxy, tricyclo[5.2.1.0$^{2,6}$]dec-3-en-8-oxy-n-propoxy, tetracyclo[6.2.1.1$^{3,6}$.0$^{2,7}$]dodec - 9-en-4-oxy, tetracyclo[6.2.1.1$^{3,6}$.0$^{2,7}$]dodec-9-en - 4 - oxyethoxy, tetracyclo[6.2.1.1$^{3,6}$.0$^{2,7}$]dodec-9-en-4-oxy - n - propoxy, tetracyclo[6.2.1.1$^{3,6}$.0$^{2,7}$]dodec - 9 - en - 4 - ylmethoxy, tetracyclo[6.2.1.1$^{3,6}$.0$^{2,7}$]dodec-9-en-4-ylethoxy, tetracyclo[6.2.1.1$^{3,6}$.0$^{2,7}$]dodec-9-en-4-yl-t-butoxy, and the like.

Illustrative subclasses of novel diolefinic diether dioxanes include, among others, 2,3(5)-bis(cycloalkenyloxy)dioxane,
2,3(5)-bis(cycloalkenylalkoxy)dioxane,
2,3(5)-bis(bicyclo[2.2.1]hept-2-en-5-oxy)dioxane,
2,3(5)-bis(bicyclo[2.2.1]hept-2-en-5-ylalkoxy)dioxane,
2,3(5)-bis(tricyclo[5.2.1.0$^{2,6}$]dec-3-en-8-oxy)dioxane,
2,3(5)-bis(tricyclo[5.2.1.0$^{2,6}$]dec-3-en-8-oxyalkoxy)dioxane,
2,3(5)-bis(tetracyclo[6.2.1.1$^{3,6}$.0$^{2,7}$]dodec-9-en-4-oxy)dioxane,
2,3(5)-bis(tetracyclo[6.2.1.1$^{3,6}$.0$^{2,7}$]dodec-9-en-4-oxyalkoxy)dioxane,
2,3(5)-bis(tetracyclo[6.2.1.1$^{3,6}$.0$^{2,7}$]dodec-9-en-4-ylalkoxy)dioxane, and the like.

Other subclasses of novel diolefinic diether dioxanes include, in addition to the symmetrical diolefinic diether dioxanes enumerated immediately above, the unsymmetrical diolefinic diether dioxanes in which the A and A$_1$ variables (of Formula I) are different.

Specific examples of novel diolefinic diether dioxanes include, for instance, 2,3(5)-bis(2-cyclopentenyloxy)dioxane,
2,3(5)-bis(3-cyclohexenyloxy)dioxane,
2,3(5)-bis(3-cycloheptenyloxy)dioxane,
2,3(5)-bis(2-cyclopentenylmethoxy)dioxane,
2,3(5)-bis(2-cyclopentenylethoxy)dioxane,
2,3(5)-bis(3-cyclohexenylmethoxy)dioxane,
2,3(5)-bis(3-cyclohexenylethoxy)dioxane,
2,3(5)-bis(3-cyclohexenyl-n-propoxy)dioxane,
2,3(5)-bis(3-cycloheptenylmethoxy)dioxane,
2,3(5)-bis(bicyclo[2.2.1]hept-2-en-5-oxy)dioxane,
2,3(5)-bis(bicyclo[2.2.1]hept-2-en-5-ylmethoxy)dioxane,
2,3(5)-bis(bicyclo[2.2.1]hept-2-en-5-ylethoxy)dioxane,
2,3(5)-bis(bicyclo[2.2.1]hept-2-en-5-propoxy)dioxane,
2,3(5)-bis(tricyclo[5.2.1.0$^{2,6}$]dec-3-en-8-oxy)dioxane,
2,3(5)-bis(tricyclo[5.2.1.0$^{2,6}$]dec-3-en-8-oxybutoxy)dioxane,
2,3(5)-bis(tetracyclo[6.2.1.1$^{3,6}$.0$^{2,7}$]dodec-9-en-4-oxy)dioxane,
2,3(5)-bis(tetracyclo[6.2.1.1$^{3,6}$.0$^{2,7}$]dodec-9-en-4-methoxy)dioxane,
2,3(5)-bis(tetracyclo[6.2.1.1$^{3,6}$.0$^{2,7}$]dodec-9-en-4-oxyethoxy)dioxane,
2,3(5)-bis(tetracyclo[6.2.1.1$^{3,6}$.0$^{2,7}$]dodec-9-en-4-oxy-n-propoxy)dioxane,
2,3(5)-bis(tetracyclo[6.2.1.1$^{3,6}$.0$^{2,7}$]dodec-9-en-4-ylmethoxy)dioxane,
2,3(5)-bis(tetracyclo[6.2.1.1$^{3,6}$.0$^{2,7}$]dodec-9-en-4-ylethoxy)dioxane,
2,3(5)-bis(tetracyclo[6.2.1.1$^{3,6}$.0$^{2,7}$]dodec-9-en-4-ylbutoxy)dioxane, and the like.

As indicated previously, the novel unsymmetrical diolefinic diether dioxanes are also contemplated within the scope of the invention and various illustrative specific examples are readily apparent from the preceding discussion commencing with Formula II supra.

The novel dioxanes, i.e., the novel diepoxydioxanes and the novel diolefinic diether dioxanes, of the invention include the 1,4-dioxanes.

The novel diepoxydioxanes can be prepared by the reaction of the corresponding diolefinic diether dioxane precursor, e.g., bis(alkenyloxy)dioxane, bis(cycloalkenyloxy)dioxane, bis(cycloalkenylalkoxy)dioxane, bis(bicyclo[2.2.1]hept - 2 - en - 5-oxy)dioxane, bis(bicyclo[2.2.1]hept-2-en-5-ylalkoxy)dioxane, bis(tricyclo[5.2.1.0$^{2,6}$]dec-3 - en - 8 - oxy)dioxane, bis(tricyclo[5.2.1.0$^{2,6}$]dec-3-en-8-oxyalkoxy)dioxane, bis(tetracyclo[6.2.1.1$^{3,6}$.0$^{2,7}$]dodec-2-en - 4 - oxy)dioxane, bis(tetracyclo[6.2.1.1$^{3,6}$.0$^{2,7}$]dodec-9-en-4-oxyalkoxy)dioxane, and bis(tetracyclo[6.2.1.0$^{3,6}$.0$^{2,7}$]dodec-9-en-4-ylalkoxy)dioxane, with an organic peracid. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to about 50 weight percent of peracid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably from about 25° to about 75° C. It is highly desirable to employ an excess of the stoichiometric quantity of peracid (per carbon to carbon double bond of the diolefinic diether precursor) in order to effect or favor substantial diepoxidation of said precursor. For instance, from about 2.2 to about 10, and higher mols of peracid per mol of diolefinic diether precursor can be employed with advantageous results. The epoxidation reaction is conducted for a period of time sufficient to introduce oxirane oxygen at the site of the carbon to carbon double bonds present in the diolefinic diether precursor, e.g., from several minutes to several hours. Periodic analysis of samples of the reaction mixture to determine the quantity of peracid consumed during the diepoxidation reaction can be readily performed by the operator by well-known techniques. At the termination of the epoxidation reaction, the unreacted diolefinic diether precursor, acid by-product, unspent peracid, inert vehicle, if employed, and the like, can be recovered from the reaction product mixture, for example, by distillation under reduced pressure. Further well-known purification techniques can be employed, as desired.

The diolefinic diether precursor can be prepared by the reaction of 2,3-dichlorodioxane or 2,5-dichlorodioxane with the appropriate monoethylenically unsaturated alcohol or mixtures thereof, e.g., alkenol, cycloalkenol, cycloalkenylalkanol, bicyclo[2.2.1]hept-2-en-5-ol, bicyclo[2.2.1]hept-2-en-5-ylalkanol, tricyclo[5.2.1.0$^{2,6}$]dec-3-en-8-ol, tricyclo[5.2.1.0$^{2,6}$]dec-3-en-8-oxyalkanol, tetracyclo[6.2.1.1$^{3,6}$.0$^{2,7}$]dodec-9-en-4-ol, tetracyclo[6.2.1.1$^{3,6}$.0$^{2,7}$]dodec-9-en-4-oxyalkanol, and tetracyclo[6.2.1.1$^{3,6}$.0$^{2,7}$]dodec-9-en-4-ylalkanol, preferably in a molar ratio of one mole of dichlorodioxane to at least two mols of monoethylenically unsaturated alcohol. This reaction readily proceeds at room temperature, e.g., about 24° C., and the gaseous hydrogen chloride by-product can be continuously removed during the reaction. The desired diolefinic diether precursor can be recovered from the resulting reaction product mixture via conventional techniques such as distillation, fractionation, crystallization, and the like.

The 2,3-dichlorodioxane reagent can be prepared by reaction of dioxane and chlorine gas, at elevated temperatures, e.g., about 70° to 100° C., in the absence or presence of a catalyst, e.g., stannous chloride. Thereafter, nitrogen gas can be bubbled through the resulting reaction product mixture to remove any unreacted chlorine, if desired. Unreacted dioxane can be removed from said reaction product mixture by conventional means, e.g., distillation under reduced pressure, thus giving 2,3-dichlorodioxane.

The 2,5-dichlorodioxane reagent can be prepared by the reaction of dioxane and chlorine gas, at relatively low temperatures, e.g., about −30° C. to about 0° C., generally in the presence of an inert normally liquid organic vehicle, e.g., carbon tetrachloride. The resulting reaction product mixture then can be cooled in a Dry Ice bath which causes 2,5-dichlorodioxane to crystallize from said reaction product mixture. The 2,5-dichlorodioxane is readily recovered therefrom via well-known techniques, e.g., crystallization.

The preparation of the alkenols, cycloalkenols, and cycloalkenylalkanols are documented in the literature.

The preparation of bicyclo[2.2.1]hept-2-en-5-ol is effected by the reaction of cyclopentadiene and vinyl acetate, at an elevated temperature, e.g., about 180° C., for a period of several hours, e.g., about 3 hours, to produce 5-acetoxybicyclo[2.2.1]hept-2-ene. This bicyclo product then is reacted with potassium hydroxide, under refluxing conditions, to give bicyclo[2.2.1]hept-2-en-5-ol.

The preparation of bicyclo[2.2.1]hept-2-en-5-ylalkanol is accomplished by the reaction of cyclopentadiene with an alkenol, e.g., allyl alcohol, crotyl alcohol, 2-hexenol, and the like, at an elevated temperature, e.g., about 180° C., and for a period of time sufficient to produce bicyclo [2.2.1]hept-2-en-5-ylalkanol.

The preparation of tricyclo[5.2.1.0$^{2,6}$]dec-3-en-8-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0$^{2,6}$]dec-3-en-8-ol as the product.

The preparation of tricyclo[5.2.1.0$^{2,6}$]dec-3-en-8-oxyalkanol or tetracyclo[6.2.1.1$^{3,6}$.0$^{2,7}$]dodec-9-en-4-oxyalkanol is accomplished, for example, by reacting a molar excess of a dihydric alcohol, e.g., ethylene glycol, the propanediols, the butanediols, and the like, with dicyclopentadiene or tetracyclo[6.2.1.1$^{3,6}$.0$^{2,7}$]dodeca-4,9-diene (which latter diene is prepared by reacting cyclopentadiene with acetylene for about 1 hour at 180° C. to give bicyclo[2.2.1]hepta-2,5-diene which in turn reacts with cyclopentadiene under the same conditions to yield tetra [6.2.1.1$^{3,6}$.0$^{2,7}$]dodeca-4,9-diene), in the presence of boron trifluoride catalyst, at an elevated temperature, e.g., from about 50° C., and lower, to about 125° C., and higher, and for a period of time to produce tricyclo[5.2.1.0$^{2,6}$]dec-3-en-8-oxyalkanol and tetracyclo[6.2.1.1$^{3,6}$.0$^{2,7}$]dodec-9-en-4-oxyalkanol as the product.

The preparation of tetracyclo[6.2.1.1$^{3,6}$.0$^{2,7}$]dodec-9-en-4-ol is as follows. The Diels-Alder reaction of equimolar quantities of cyclopentadiene and vinyl acetate results in 5-acetoxy-bicyclo[2.2.1]hept-2-ene. Subsequent reaction of the bicyclo product with cyclopentadiene yields 4-acetoxy-tetracyclo[6.2.1.1$^{3,6}$.0$^{2,7}$]dodec-9-ene. The reaction of the tetracyclo product with potassium hydroxide yields tetracyclo[6.2.1.1$^{3,6}$.0$^{2,7}$]dodec-9-en-4-ol. The reaction conditions are similar to those set forth in the preparation of bicyclo[2.2.1]hept-2-en-5-ol.

The preparation of tetracyclo[6.2.1.1$^{3,6}$.0$^{2,7}$]dodec-9-en-4-ylalkanol, also, can be prepared via the Diels-Alder synthesis route. For instance, the reaction of at least two mols of cyclopentadiene with one mol of alkenol will yield tetracyclo[6.2.1.1$^{3,6}$.0$^{2,7}$]dodec-9-en-4-ylalkanol. The reaction conditions have been discussed supra in connection with bicyclo[2.2.1]hept-2-en-5-oxyalkanol.

In one aspect, the invention is directed to the preparation of novel homopolymeric products of the novel diepoxydioxanes. These novel homopolymeric products can be prepared by contacting the diepoxydioxane with an acidic or basic catalyst described hereinafter, at a temperature in the range of from about 25° C., and lower, to about 250° C., and higher, and for a period of time sufficient to produce said homopolymeric products. These useful products can range from soft to hard, tough resins.

The acidic and basic catalysts which can be employed in the polymerization reaction include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the tertiary amines, e.g., alphamethylbenzyldimethylamine, dimethylethylamine, triethylamine, tripropylamine, trimethylammonium hydroxide, and the like.

Catalyst concentrations and polymerization temperatures are believed to affect the polymerization rate, the higher concentrations and temperatures promoting faster reaction rates than the lower ones. The catalyst concentration can be varied over a broad range and can be selected on the basis of the rate of polymerization desired and the polymerization temperature to be used. It has been observed that a catalyst concentration in the range of from about 0.005 to 10 weight percent, preferably from about 0.01 to 5 weight percent, based on the weight of diepoxydioxane, is advantageous in forming useful polymeric products.

In other aspects, the invention is directed to novel curable, polymerizable compositions comprising diepoxydioxane and an active organic hardener, and to the partially cured (fusible thermosetting intermediate reaction products) and cured resins resulting therefrom. The active organic hardeners illustrated hereinafter are employed in a curing amount that is, an amount which is sufficient to cause the curable system comprising the novel diepoxydioxane(s) to become a thermosetting or thermoset copolymeric resin in accordance with the teachings of the instant specification. Representative active organic hardeners include polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like. The novel curable compositions can contain one active organic hardener or a mixture of active organic hardeners.

The curable compositions of the invention can be prepared by mixing the diepoxydioxane with the active organic hardener(s), preferably under agitation, so as to obtain a homogeneous mixture. The order of addition of the components does not appear to be critical. Heating is advantageous in facilitating the formation of a solution. The application of heat should not be prolonged to the extent that appreciable curing takes place.

The curable compositions of the invention can be partially cured or fully cured by maintaining the temperature in the range of from about 25° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one of combination of two or more temperatures within the specified range of 25° C. to 250° C. can be employed, if desired, to effect the full cure.

The time for effecting the partial cure or the complete cure will be governed, to an extent, on several factors such as the particular active organic hardener(s) employed, the proportions of diepoxydioxane and active organic hardener(s), the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to 24 hours, depending upon the correlation of such factors as illustrated above.

If desired, basic or acidic catalysts such as those illustrated previously can be incorporated into the curable compositions of the invention to increase the cure rate and/or reduce the gelation period. Catalyst concentrations of the order described previously can be employed.

In one preferred embodiment, the invention is directed to novel curable, partially cured, and cured compositions comprising diepoxydioxane and a polycarboxylic acid in such relative amounts so as to provide from about 1.0 to about 2.0 carboxy groups, i.e., —COOH groups, of said polycarboxylic acid per epoxy group, i.e.,

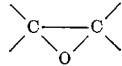

group, of the diepoxydioxane, and preferably from about 0.3 to about 1.2 carboxy groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkenylsuccinic acids, maleic acid, fumaric acid, itaconic acid, citraconic acid, mesaconic acid, glutaconic acid, allylmalonic acid, muconic acid, the hydromuconic acids, diglycolic acid, dilactic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,3-propanetricarboxylic acid, 1,2,4-benzenetricarboxylic acid, 1,2,4-benzenetricarboxylic acid, 1,3,5-benzenetricarboxylic acid, 1,2,3,4-benzenetetracarboxylic acid, benzenepentacarboxylic acid, benzenehexacarboxylic acid, and the like. Copolymers of acrylic acid and an olefinically unsaturated monomer such as butadiene, styrene, ethyl acrylate, vinyl halide, and the like also can be employed. In addition, the dimerized and trimerized unsaturated fatty acids of, for example, linoleic acid, oleic acid, linolenic acid, undecylenic acid, and the like are useful. Polycarboxylic acids which have melting points below about 250° C. are desirable.

In a second preferred embodiment, the invention is directed to novel curable, partially cured, and cured compositions comprising diepoxydioxane and a polycarboxylic acid anhydride in such relative amounts so as to provide from about 0.1 to about 4.0 carboxy groups of the polycarboxylic acid anhydride per epoxy groups of diepoxydioxane, and preferably from about 0.8 to about 2.5 carboxy groups per epoxy group. It should be noted that by the expression "carboxy groups of the polycarboxylic acid anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of polycarboxylic acid anhydride" is meant the carboxy groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides, and preferably, the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, methyltetrahydrophthalic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, and the like. Polycarboxylic acid anhydrides which have melting points below about 250° C. are desirable.

In a third preferred embodiment, the invention is directed to novel curable, partially cured, and cured compositions comprising diepoxydioxane and a polyol in such relative amounts so as to provide from about 1.0 to about 2.0 hydroxy groups, i.e., —OH groups, of said polyol per epoxy group of diepoxydioxane, and preferably from about 0.2 to about 1.0 hydroxy group per epoxy group. By the term "polyol," as used herein including the appended claims, is meant an organic compound having at least two hydroxyl groups, which are alcoholic hydroxy groups, phenolic hydroxy groups, or both alcoholic and phenolic hydroxy groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, 2-butene-1,4-diol, the pentanediols, the pentenediols, 2-ethyl-1,3-hexanediol, the hexenediols, 2-methoxy-2,4-dimethyl-1,5-pentanediol, 12,13-tetracosanediol, polyglycerol, 1,1,1-trimethylolpropane, pentaerythritol, sorbitol, the polyvinyl alcohols, the octenediols the cyclopentanediols, the cyclohexanediols, the lower alkyl substituted-cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis (4-hydroxyphenyl)methane, 1,9-naphthalenediol, the polyhydric phenol-formaldehyde condensation products, and the like. The alkylene oxide adducts, e.g., ethylene oxide, propylene oxide, etc., of polyhydric alcohols of polyhydric phenols such as those illustrated above also are highly suitable. Polyols having melting points below about 250° C. are desirable.

A fourth preferred embodiment of the invention is directed to novel curable, partially cured, and cured compositions comprising diepoxydioxane and a polycarboxy polyester in such relative amounts so as to provide from about 0.1 to about 2.0 carboxy groups of said polycarboxy polyester per epoxy group of diepoxydioxane, and preferably from about 0.3 to about 1.2 carboxy groups per epoxy group. By the term "polycarboxy polyester," as used herein including the appended claims, is meant a polyester which contains at least two carboxy groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxy groups, collectively, than are required to react with the hydroxy groups contained in the amount of polyhydric alcohol so that the resulting esterified product, i.e., polycarboxy polyester, contains at least two free carboxy groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C., with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured composition (resin) set forth previously in the discussion of the four preferred embodiments. Special and highly desirable effects can be imparted to the partially cured and fully cured compositions by incorporating a second active organic hardener (hereinafter termed "modifier") into the curable composition comprising the diepoxydioxane and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the monomeric diepoxide. For instance, to a curable composition comprising diepoxydioxane and a polycarboxylic acid, there can be added an amount of a modifier, e.g., polycarboxylic acid anhydride, polycarboxy polyester, polyol, etc., such that the ratio of reactive groups contained by the modifier with respect to the carboxy groups contained by the polycarboxylic acid is less than one. On this basis the modifier can be considered to be the minor component in relation to the polycarboxylic acid. As a second illustration, if the curable composition comprises diepoxydioxane and a polyol, and amount of modifier, e.g., polycarboxylic acid, polycarboxy polyester, polycarboxylic acid anhydride, polyisocyanate, polythiol, etc., can be added to said curable mixture such that the ratio of the reactive groups contained by the modifier with respect to the hydroxy groups contained by the polyol is less than one. Again it will be noted that the modifier is the minor component with respect to the polyol. The modifiers which can be employed are those illustrated previously in the discussion of polycarboxylic acids polycarboxylic acid anhydrides, polyol, polycarboxy polyesters, etc.

A fifth preferred embodiment is directed to curable, partially cured, and cured compositions comprising diepoxydioxane and a polyfunctional amine in such relative amounts so as to provide from about 0.2 to about 5.0 amino hydrogen atoms of said polyfunctional amine per epoxy group of diepoxydioxane, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

Among the polyfunctional amide subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphating alcohols and phenols, polyamides, addition products of polyamines and low molecular weight epoxides containing oxirane oxygen linked to vicinal carbon atoms, and others.

The thermoset cured resins of the invention vary from soft and flexible to hard and rigid products, depending upon the proportion, the functionality, and the chain length of the active organic hardenes employed. These resins are insoluble in many of the common organic solvents. The hard, infusible, rigid thermoset resins can be machined to desired shapes and configurations, and they can be polished to provide appealing finishes. The novel compositions, as indicated throughout the specification, are highly useful and valuable in fields such as the coatings, laminating, molding, encapsulation, etc., arts.

A sixth highly preferred embodiment is directed to curable, partially cured, and cured compositions comprising diepoxydioxane, a polycarboxylic acid anhydride which contains a polymerizable double bond, and an active olefinically unsaturated organic monomer. To the curable mixture, there can be added a fourth component, that is, a polyol such as those previously described. The polyol can contain olefinic unsaturation or it can be fully saturated. However, should the polyol contain olefinic unsaturation, then the polycarboxylic acid anhydride component can be fully saturated, if desired. Thus, in the four component system both the polycarboxylic acid anhydride and the polyol components can contain olefinic unsaturation, or either component can contain olefinic unsaturation. The three and four component curable systems have been found to possess several highly desirable and unexpected advntages. Many of the resulting cured resins exhibit high and efficient thermal stability at elevated temperatures by virtue of including the active olefinically unsaturated organic monomer in the curable compositions. The inclusion of certain olefinically unsaturated organic monomer to the curable system also results in the lowering of the melt temperature, and in the reduction of the viscosity of the system as compared to the corresponding curable system lacking same. The saturated and unsaturated polycarboxylic acid anhydrides and polyols have been illustrated previously. Maleic anhydride is highly preferred as the polycarboxylic acid anhydride component. It is desirable that the relative proportions of diepoxydioxane, polycarboxylic acid anhydride, and active olefinically unsaturated organic monomer, with or without the polyol component (preferably polyhydric alcohol compound), comprising the curable compositions are such so as to provide from about 0.2 to about 5.0 (preferably from about 0.4 to about 2.0) carboxy groups of anhydride per epoxy group of monomeric diepoxydioxane, and from 0.0 to about 2.0 (preferably from about 0.05 to about 1.0) hydroxy groups of polyol per epoxy group of monomeric diepoxydioxane. The quantity of active olefinically unsaturated organic monomer is most conveniently based on a ratio of ethylenic groups of said monomer per ethylenic group of polycarboxylic acid anhydride and/or polyol. Thus, it is desirable to employ the polycarboxylic acid anhydride, polyol, and active olefinically unsaturated organic monomer in amounts so as to provide from about 0.002 to about 5.0, preferably from about 0.2 to about 2.0, ethylenic groups of active olefinically unsaturated organic monomer per ethylenic group of polycarboxylic acid anhydride and/or polyol. It should be noted that the term "ethylenic group" refers to the $>C=C<$ group. Illustrative active olefinically unsaturated monomers include the mono- and polyolefinic hydrocarbons, e.g., the heptenes, the nonenes, hexadiene, cyclopentene, cyclohexane, lower alkyl substituted-cyclohexene, styrene, divinylbenzene, and the like; the olefinic esters, ethers, and acids, e.g., divinyl ether, diallyl either, di(2-butenyl) ether, methyl methacrylate, propyl acrylate, methyl acrylate, ethyl acrylate, methyl crotonate, allyl crotonate, crotonic acid, cinnamic acid, acrylic acid, diallyl phthalate, 2-pentenoic acid, and the like; and the halogenated vinylbenzenes, and the like. Styrene is highly preferred.

The use of catalysts in the novel curable compositions described in the sixth embodiment is optional. Acidic and basis catalysts such as those described previously can be employed, if desired, to increase the rate of reaction between the polycarboxylic acid anhydride and the diepoxydioxane. In certain instances, it may be desirable to catalyze the reaction or polymerization of the polycarboxylic acid anhydride and the active olefinically unsaturated organic monomer. Among such latter catalysts are, by way of illustration, benzoyl peroxide, t-butyl hydroperoxide, cumene hydroperoxide, acetyl peroxide, p-methane hydroperoxide, lauroyl peroxide, di-t-butyl peroxide, t-butyl perbenzoate, and the like.

A seventh preferred embodiment is directed to curable and partially cured compositions (fusible thermosetting intermediate reaction products that are viscous liquids or solids) comprising diepoxydioxane, and an active organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above exemplary list of organic media can be used as, for example, surface coating which can be subsequently heat cured to hard, tough, scratch-resistant coatings.

The proportion of partially cured resin, i.e., fusible thermosetting intermediate reaction products, to organic media will depend on various factors such as the particular mixture being cured, the degree or extent of the partial cured, the particular organic medium employed, and other considerations. In general, a solution comprising from about 10 to about 90 weight percent of the partially cured resin, based on the total weight of partially cured resin and organic medium, is suitable; from about 40 to 70 weight percent of the partially cured resin, based on the total weight of partially cured resin and organic medium is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment, the invention is directed to the preparation of valuable varnishes which are obtained by the reaction of diepoxydioxane with aliphatic monocarboxylic acids, at elevated temperatures, e.g., from about 100° C. to about 200° C., for a period of time ranging from about 0.5 to 10 hours, and longer, followed by homopolymerizing the resulting reaction product (which contains residual or free epoxy and hydroxy groups) with an epoxy polymerization catalyst such as those described previously, preferably at a temperature in the range of from about 25° to 250° C., to thus produce high molecular weight polymeric products commonly known to the art as varnishes. The amounts of aliphatic monocarboxylic acid and diepoxydioxane employed are such so as to provide from about 0.3 to about 0.7 carboxy group of monocarboxylic acid per epoxy group of diepoxydioxane. The unsaturated aliphatic monocarboxylic acids are preferred. Illustrative acids include hexanoic acid, caprylic acid, lauric acid, capric acid, myristic acid, oleic acid, linoleic acid, stearic acid, licanic acid, ricinoleic acid, hexenoic acid, hexadienoic acid, octenoic acid, and the like. Acids derived from natural sources such as castor oil, dehydrated castor oil, coconut oil, cottonseed oil, oiticica oil, perilla oil, olive oil, safflower oil, sardine oil, soyabean oil, tall oil, tung oil, and the like, are advantageous to employ both from an economy standpoint and since highly useful varnishes result from the process. If desired, the reaction between diepoxydioxane and the aliphatic monocarboxylic acid can be effected in the presence of an acidic or basic catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like. The homopolymerization of the reaction product which contains residual or free epoxy and hydroxy groups can also be effected, if desired, in the presence of an inert normally-liquid organic medium such as those illustrated supra. The progress of the homopolymerization reaction can be observed by determining the relative viscosity of samples drawn from the reaction mixture. In this manner, it is possible to produce partially polymerized compositions or essentially complete polymerized compositions.

The polymerized compositions of the last mentioned preferred embodiment generally are obtained as solid-like products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatibility, they impart improved caustic, water, and chemical resistance to the resin coatings they are modifying, and they impart improved flexibility and toughness. The drying compositions are capable of "drying" or curing to excellent protective coatings, with or without the application of heat. It is generally desirable to employ various metallic salts of organic compounds known to the art as "driers" to accelerate the drying process. The drying can be accomplished at temperatures in the range of from about 10° to about 250° C. and for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment, valuable varnish compositions can be obtained by the reaction of diepoxydioxane with polyol(s), preferably diol(s), at a temperature in the range of from about 25° to about 250° C., for a period of time ranging from about 0.5 to 10.0 hours, and longer, followed by partial or essentially complete esterification of the fusible, polymeric polyhydric product with an aliphatic monocarboxylic acid, preferably at elevated temperatures, to produce high molecular weight polymeric products (varnishes) which may contain residual or free hydroxy groups. The proportions of polyol and diepoxydioxane employed are such so as to provide from about 0.5 to about 1.5 hydroxy groups of polyol per epoxy group of diepoxydioxane. The polyols and aliphatic monocarboxylic acids which can be employed have been illustrated previously. The use of catalysts and solvents, if desired, has also been discussed supra.

A single novel diolefinic diether dioxane or a mixture of novel diolefinic diether dioxanes which are described in Formula II supra can be polymerized through their ethylenic group(s) to give soluble, fusible, essentially linear polymeric products which have utility in the molding, film-fabricating, potting, etc., arts. In addition, the novel diolefinic diether dioxanes can be copolymerized with other olefinically unsaturated organic monomers, through their ethylenic groups to give useful polymeric products. Illustrative olefinically unsaturated organic monomers have been described in the sixth embodiment supra. The polymerization reaction can be effected in the presence in of well known vinyl polymerization catalysts such as peroxide compounds, e.g., benzoyl peroxide, cumene hydroperoxide, acetyl peroxide, p-menthane hydroperoxide, di-t-butyl peroxide, and the like. The polymerization reaction can be conducted at a temperature in the range of about 0° C. to about 150° C., and higher, and for a period of time sufficient to yield the desired polymeric products.

The following examples are illustrative. The description of the resins were ascertained at room temperature, i.e., about 24° C.

EXAMPLE I

A mixture of 872 grams aqueous glyoxal (26.6 weight percent glyoxal, 8.8 weight percent ethylene glycol), 170 grams of ethylene glycol, 696 grams of allyl alcohol, and 3 grams of sulfuric acid was charged to the kettle of a still which was fitted with a decanting head. The mixture was boiled under reflux until the theoretical amount of water was removed overhead using 600 ml. of benzene as the azeotroping agent. The catalyst was then neutralized with sodium acetate and the mixture was rapidly distilled to give, after removal of the low-boiling materials, 400 grams of product, B.P. 83–92° C./3 mm. of Hg. Redistillation of this 400 grams cut gave 310 grams of 2,3-diallyloxydioxane, B.P. 75–77° C./0.6 mm. of Hg, $n_D^{30}$ 1.4549.

EXAMPLE 2

To 225 grams of 2,3-diallyloxy-1,4-dioxane which was maintained with stirring at 60° C., there was added dropwise over a period of 2.75 hours 998 grams of a 24.3 weight percent solution of peracetic acid in ethyl acetate. After an additonal four hours at 60° C., the reaction was 93 percent complete as indicated by a titration of the solution for peracetic acid. After standing overnight at 0° C., the volatiles were removed by co-distillation with 1450 grams of ethylbenzene and the residue was distilled through a 8 inch x 32 mm. glass helices-packed column to give a cut of 221 grams of 2,3-di-(2,3-epoxypropoxy)-1,4-dioxane, B.P. 125°–140° C./0.25 mm. of Hg, $n_D^{30}$ 1.4632–1.4683. A hearts cut of the diepoxy product had the following properties: B.P. 140° C./0.25 mm. of Hg, $n_D^{30}$ 1.4678, purity 97 percent by epoxide analysis (pyridine hydrochloride method).

| Elemental analysis ($C_{10}H_{16}O_6$) | Carbon | Hydrogen |
|---|---|---|
| Calculated | 51.72 | 6.94 |
| Found | 51.79 | 6.89 |

EXAMPLE 3

To a reaction vessel, there are charged 2,3-dichloro-1,4-dioxane (1 mole) and 3-cyclohexenol (4 moles). The resulting mixture then is heated to an elevated temperature, e.g., about 130° C., under stirring, until the evolution of hydrogen chloride has essentially ceased. Thereafter, the reaction product mixture is subjected to distillation under reduced pressure to remove the unreacted 3-cyclohexenol. The residue then is distilled under reduced pressure to give a distillate which is identified as 2,3-bis(3-cyclohexenyloxy)-1,4-dioxane by its iodine number (according to the Wijs procedure) and by inspection of its infrared absorption spectrum.

EXAMPLE 4

To a reaction vessel which contains 2,3-bis(3-cyclohexenyloxy)-1,4-dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,3-bis(3,4-epoxycyclohexyloxy)-1,4-dioxane by inspection of its infrared absorption spectrum and by analysis for oxirane oxygen.

EXAMPLE 5

To a reaction vessel, there are charged 2,5-dichloro-1,4-dioxane (1 mole) and 6-methyl-3-cyclohexenylmethanol (4 moles). The resulting mixture then is heated to an elevated temperature, e.g., about 80° C., under stirring, until the evolution of hydrogen chloride has essentially ceased. Thereafter, the reaction product mixture is subjected to distillation under reduced pressure to remove the unreacted 6-methyl-3-cyclohexenylmethanol. The residue then is distilled under reduced pressure to give a distillate which is identified as 2,5-bis(6-methyl-3-cyclohexenylmethoxy)-1,4-dioxane by its iodine number (according to the Wijs procedure) and by inspection of its infrared absorption spectrum.

EXAMPLE 6

To a reaction vessel which contains 2,5-bis(6-methyl-3-cyclohexenylmethoxy)-1,4-dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,5-bis(3,4-epoxy-6-methylcyclohexylmethoxy)-1,4-dioxane by inspection of its infrared absorption spectrum and by analysis for oxirane oxygen.

EXAMPLE 7

To a reaction vessel, there were charged 2,3-dichloro-1,4-dioxane (1 mole) and tricyclo[5.2.1.0$^{2,6}$]dec-3-en-8-ol (4 moles). The resulting mixture was heated to 135° C., under stirring, for 4.5 hours. Thereafter the reaction product mixture was subjected to distillation under reduced pressure to remove the unreacted tricyclo-[5.2.1.0$^{2,6}$]dec-3-en-8-ol. The residue was then extracted with boiling n-pentane, and the pentane was evaporated to afford a viscous dark-colored oily residue. This was dissolved in acetone and the resultant solution was refluxed with powdered charcoal. The solution was then filtered and the filtrate evaporated to give a residue of 2,3-bis(tricyclo[5.2.1.0$^{2,6}$]dec-3-en-8-yloxy)-1,4-dioxane; iodine number by Wijs procedure 131, theoretical iodine number 132. The infrared spectrum of this material was consistent with the assigned structure.

EXAMPLE 8

To a reaction vessel which contained 2,3-bis(tricyclo-[5.2.1.0$^{2,6}$]dec-3-en-8-yloxy)-1,4-dioxane (1.03 moles) maintained at about 35° C. with stirring, there was added, dropwise, 397 grams of a 22.7 weight percent solution of peracetic acid in ethyl acetate over a period of 1.5 hours. After an additional 5.25 hours at 35°–45° C., the reaction was essentially complete as indicated by a titration for peracetic acid. The volatile materials, i.e., ethyl acetate, acetic acid, etc., were removed from the reaction product mixture by co-distillation with ethylbenzene. There was thus obtained 2,3-bis(4-oxatetracyclo[6.2.1.0$^{2,7}$.0$^{3,5}$]undec-9-yloxy)-1,4-dioxane. Analysis of this material by the HBr-dioxane method indicated a purity of 103 percent, calculated the diepoxide.

EXAMPLE 9

To a reaction vessel, there are charged 2,3-dichloro-1,4-dioxane (1 mole) and bicyclo[2.2.1]hept-5-en-2-ol (4 moles). The resulting mixture then is heated to an elevated temperature, e.g., about 150° C., under stirring, until the evolution of hydrogen chloride has essentially ceased. Thereafter, the reaction product mixture is subjected to distillation under reduced pressure to remove the unreacted bicyclo[2.2.1]hept-5-en-2-ol. The residue then is distilled under reduced pressure to give a distillate which is identified as 2,3-bis(bicyclo[2.2.1]hept-5-en-2-yloxy)-1,4-dioxane by its iodine number (according to the Wijs procedure) and by inspection of its infrared absorption spectrum.

EXAMPLE 10

To a reaction vessel which contains 2,3-bis(bicyclo[2.2.1]hept-5-en-2-yloxy)-1,4-dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,3-bis(3-oxatricyclo[3.2.1.0$^{2,4}$]oct-6-yloxy-1,4-dioxane by inspection of its infrared absorption spectrum and by analysis for oxirane oxygen.

EXAMPLE 11

To a reaction vessel, there are charged 2,3-dichloro-1,4-dioxane (1 mole) and bicyclo[2.2.1]hept-5-en-2-ylmethanol (4 moles). The resulting mixture then is heated to an elevated temperature, e.g., about 140° C., under stirring, until the evolution of hydrogen chloride has essentially ceased. Thereafter, the reaction product mixture is subjected to distillation under reduced pressure to removed the unreacted bicyclo[2.2.1]hept-5-en-2-lymethanol. The residue then is distilled under reduced pressure to give a distillate which is identified as 2,3-bis(bicyclo[2.2.1]hept-5-en-2-ylmethoxy)-1,4-dioxane by its iodine number (according to the Wijs procedure) and by inspection of its infrared absorption spectrum.

EXAMPLE 12

To a reaction vessel which contains 2,3-bis(bicyclo[2.2.1]hept-5-en-2-ylmethoxy)-1,4-dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,3-bis(3-oxatricyclo[3.2.1.0$^{2,4}$]oct-6-ylmethoxy)-1,4-dioxane by inspection of its infrared absorption spectrum and by analysis for oxirane oxygen.

EXAMPLE 13

To a reaction vessel, there are charged 2,5-dichloro-1,4-dioxane (1 mole) and 2-(tricyclo[5.2.1.0$^{2,6}$]dec-3-en-8-yloxy)ethanol (4 moles). The resulting mixture then is heated to an elevated temperature, e.g., about 160° C., under stirring, until the evolution of hydrogen chloride has essentially ceased. Thereafter, the reaction product mixture is subjected to distillation under reduced pressure to remove the unreacted 2-(tricyclo[5.2.1.0$^{2,6}$]dec-3-en-8-yloxy)ethanol. The residue then is distilled under reduced pressure to give a distillate which is identified as 2,5-bis(2-(tricyclo[5.2.1.0$^{2,6}$]dec-3-en-8-yloxy)ethoxy)-1,4-dioxane by its iodine number (according to the Wijs procedure) and by inspection of its infrared absorption spectrum.

EXAMPLE 14

To a reaction vessel which contains 2,5-bis(2-(tricyclo[5.2.1.0$^{2,6}$]dec-3-en-8-yloxy)ethoxy)-1,4-dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,5-bis(2-(4-oxatetracyclo[6.2.1.0$^{2,7}$.0$^{3,5}$]undec-9-yloxy)ethoxy)1,4-dioxane by inspection of its infrared absorption spectrum and by analysis for oxirane oxygen.

EXAMPLE 15

To a reaction vessel, there are charged 2,3-dichloro-1,4-dioxane (1 mole) and tetracyclo[6.2.1.1$^{3,6}$.0$^{2,7}$]dodec-9-en-4-ol (4 moles). The resulting mixture then is heated to an elevated temperature, e.g., about 160° C., under stirring, until the evolution of hydrogen chloride has essentially ceased. Thereafter, the reaction product mixture is subjected to distillation under reduced pressure to remove the unreacted tetracyclo[6.2.1.1$^{3,6}$.0$^{2,7}$]dodec-9-en-4-ol. The residue then is distilled under reduced pressure to give a distillate which is identified as 2,3-bis(tetracyclo[6.2.1.1$^{3,6}$.0$^{2,7}$]dodec-9-en-4-yloxy)-1,4-dioxane by its iodine number (according to the Wijs procedure) and by inspection of its infrared absorption spectrum.

EXAMPLE 16

To a reaction vessel which contains 2,3-bis(tetracyclo[6.2.1.1$^{3,6}$.0$^{2,7}$]dodec-9-en-4-yloxy)-1,4-dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,3-bis(10-oxapentacyclo[6.3.1.1$^{3,6}$.0$^{2,7}$.0$^{9,11}$]tridec-4-yloxy)-1,4-dioxane by inspection of its infrared absorption spectrum and by analysis for oxirane oxygen.

EXAMPLE 17

To a reaction vessel, there are charged 2,3-dichloro-1,4-dioxane (1 mole) and 2-(tetracyclo[6.2.1.1$^{3,6}$.0$^{2,7}$]dodec-9-en-4-yloxy)ethanol (4 moles). The resulting mixture then is heated to an elevated temperature, e.g., about 160° C., under stirring, until the evolution of hydrogen chloride has essentially ceased. Thereafter, the reaction product mixture is subjected to distillation under reduced pressure to remove the unreacted 2-(tetracyclo[6.2.1.1$^{3,6}$.0$^{2,7}$]dodec-9-en-4-yloxy)ethanol. The residue then is distilled under reduced pressure to give a distillate which is identified as 2,3-bis(2-(tetracyclo[6.2.1.1$^{3,6}$.0$^{2,7}$]- dodec-9-en-4-yloxy)ethoxy)-1,4-dioxane by its iodine number (according to the Wijs procedure) and by inspection of its infrared absorption spectrum.

EXAMPLE 18

To a reaction vessel which contains 2,3-bis(2-(tetracyclo[6.2.1.1$^{3,6}$.0$^{2,7}$]dodec-9-en-4-yloxy)ethoxy)-1,4 - dioxane (0.500 mole) maintained about 40° C. with stirring, there is added, dropwise, 334.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,3-bis(2-(10-oxapentacyclo-[6.3.1.1$^{3,6}$.0$^{2,7}$.0$^{9,11}$]tridec-4-yloxy)ethoxy)-1,4-dioxane by inspection of its infrared absorption spectrum and be analysis for oxirane oxygen.

EXAMPLE 19

To a reaction vessel, there are charged 2,3-dichloro-1,4-dioxane (1 mole) and tetracyclo[6.2.1.1$^{3,6}$.0$^{2,7}$]dodec-9-en-4-ylmethanol (4 moles). The resulting mixture then is heated to an elevated temperature, e.g., about 180° C., under stirring, until the evolution of hydrogen chloride has essentially ceased. Thereafter, the reaction product mixture is subjected to distillation under reduced pressure to remove the unreacted tetracyclo[6.2.1.1$^{3,6}$.0$^{2,7}$]-dodec-9-en-4-ylmethanol. The residue then is distilled under reudced pressure to give a distillate which is identified as 2,3-bis(tetracyclo[6.2.1.1$^{3,6}$.0$^{2,7}$]dodec-9-en-4-ylmethoxy)-1,4-dioxane by its iodine number (according to the Wijs procedure) and by inspection of its infrared absorption spectrum.

EXAMPLE 20

To a reaction vessel which contains 2,3-bis(tetracyclo-[6.2.1.1$^{3,6}$.0$^{2,7}$]dodec-9-en-4 - ylmethoxy) - 1,4 - dioxane (0.500 mole) maintained about 40° C. with stirring, there is added, dropwise, 33.4 grams of a 25 weight percent solution of peracetic acid in ethyl acetate over a period of 4 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,3-bis(10-oxapentacyclo[6.3.1.1$^{3,6}$.0$^{2,7}$.0$^{9,11}$]tridec-4-ylmethoxy)-1,4-dioxane by inspection of its infrared absorption spectrum and by analysis for oxirane oxygen.

EXAMPLE 21

To a reaction vessel, there are charged 50 parts by weight of 2,5-bis(2,3-epoxypropoxy)-1,4-dioxane and 1.5 parts by weight of sulfuric acid (contained as a 26 weight percent aqueous solution). The resulting admixture then is heated to 170° C. for a period of 2 hours plus an additional 2 hours at 185° C. There is obtained a hard, solid homopolymeric product.

EXAMPLE 22

To a reaction vessel, there are charged 100 parts by weight of 2,3-bis(3,4-epoxycyclohexyloxy)-1,4-dioxane and 2 parts by weight of boron trifluoride-piperidine complex. The resulting admixture then is heated to 120° C. for a period of 3 hours plus an additional 6 hours at 160° C. There is obtained a hard, solid homopolymeric product.

EXAMPLE 23

To a reaction vessel, there are charged 100 parts by weight of 2,5-bis(3,4-epoxy-6-methylcyclohexylmethoxy)-1,4,dioxane and 2 parts by weight of boron trifluoride-1,6-hexane-diamine complex. The resulting admixture then is heated to 120° C. for a period of 4 hours plus an additional 4 hours at 160° C. There is obtained a hard, solid homopolymeric product.

EXAMPLE 24

To a reaction vessel, there are charged 2,3-bis(2,3-epoxypropoxy)-1,4-dioxane and sebacic acid in amounts so as to provide 0.5 carboxy group of said acid per epoxy group of the diepoxide. The resulting admixture subsequently is heated to 80° C. for a period of 2 hours plus 2 hours at 120° C. plus an additional 4 hours at 180° C. There is obtained a hard, solid resin.

EXAMPLE 25

To a reaction vessel, there are charged 2,3-bis(4-oxatetracyclo[6.2.1.0$^{2,7}$.0$^{3,5}$]undec-9-yloxy)-1,4-ioxane and adipic acid in amounts so as to provide 0.6 carboxy group of said acid per epoxy group of the diepoxide. The resulting admixture subsequently is heated to 80° C. for a period of 2 hours plus 4 hours at 120° C. plus an additional 4 hours at 180° C. There is obtained a hard, solid resin.

EXAMPLE 26

To a reaction vessel, there are charged 2,3-bis(3-oxatricyclo[3.2.1.0$^{2,4}$]oct-6-yloxy)-1,4-dioxane and succinic anhydride in amounts so as to provide 1.0 carboxy group of said anhydride per epoxy group of the diepoxide. The resulting admixture subsequently is heated to 100° C. for a period of 2 hours plus 4 hours at 120° C. plus an additional 4 hours at 160° C. There is obtained a hard, solid resin.

EXAMPLE 27

To a reaction vessel, there are charged 2,3-bis(3-oxatricyclo[3.2.1.0$^{2,4}$]oct - 6 - ylmethoxy)-1,4-dioxane and maleic anhydride in amounts so as to provide 1.0 carboxy group of said anhydride per epoxy group of the diepoxide. The resulting admixture subsequently is heated to 80° C. for a period of 2 hours plus 4 hours at 120° C. plus an additional 6 hours at 160° C. There is obtained a hard, tough, solid resin.

EXAMPLE 28

An admixture of 2,5 - bis(2 - (4 - oxatetracyclo [6.2.1.0$^{2,7}$.0$^{3,5}$]undec-9-yloxy)ethoxy) - 1,4 - dioxane and ethylene glycol is prepared in such relative amounts so as to provide 0.8 hydroxy group of said ethylene glycol per epoxy group of the diepoxide. Boron trifluoride-monoethylamine complex (3 weight percent, based on the total weight of the reactants) then is added thereto. Subsequently, the resulting admixture is heated to 120° C. for a period of 3 hours plus an additional 6 hours at 160° C. There is obtained a hard, solid resin.

EXAMPLE 29

An admixture of 2,3 - bis(10 - oxapentacyclo [6.3.1.1$^{3,6}$.0$^{2,7}$.0$^{9,11}$]tridec - 4 - yloxy) - 1,4 - dioxane and glycerol is prepared in such relative amounts so as to provide 1.2 hydroxy groups of said glycerol per epoxy group of the diepoxide. Boron trifluoride-1,6-hexanediamine complex (2 weight percent, based on the total weight of the reactants) then is added thereto. Subsequently, the resulting admixture is heated to 120° C. for a period of 2 hours plus an additional 6 hours at 180° C. There is obtained a hard, solid resin.

EXAMPLE 30

An admixture of 2,3 - bis(2 - (10 - oxapentacyclo [6.3.1.1$^{3,6}$.0$^{2,7}$.0$^{9,11}$]tridec - 4 - yloxy)ethoxy)-1,4-dioxane and diethylenetriamine is prepared in such relative amounts so as to provide 1.0 amino hydrogen atom of said diethylenediamine per epoxy group of the diepoxide. Boron trifluoridepiperidine complex (2 weight percent, based on the total weight of the reactants) then is added thereto. Subsequently, the resulting admixture is heated to 120° C. for a period of 4 hours plus an additional 8 hours at 160° C. There is obtained a hard, solid resin.

EXAMPLE 31

A mixture is prepared from 2,3-bis(10-oxapentacyclo[6.3.1.1$^{3,6}$.0$^{2,7}$.0$^{9,11}$]tridec - 4 - ylmethoxy) - 1,4 - dioxane and adipic acid in amounts so as to provide 0.7 carboxy group of said adipic acid per epoxy group of the diepoxide. The resulting mixture is heated to 100° C. for a period of 10 minutes, and upon cooling to room temperature, i.e., approximately 24° C., a fusible, thermosetting product is obtained. The resulting product is dissolved in methyl isobutyl ketone at 100° C., and an iron panel or strip is dipped into the resulting solution. The iron panel subsequently is removed from this solution, is air dried for 30 minutes, and is baked at 160° C. for 3 hours. A thin coating is observed on that portion of the dipped iron panel. The resulting coating on the panel is glossy and tough. The coating displays excellent adhesion to the panel.

EXAMPLE 32

A mixture is prepared from 2,5-bis(2,3-epoxybutoxy)-1,4-dioxane and phthalic anhydride in amounts so as to provide 1.0 carboxy group of said phthalic anhydride per epoxy group of the diepoxide. The resulting mixture is heated at 120° C. for a period of 8 minutes, and upon cooling to room temperature, i.e., approximately 24° C., a fusible, thermosetting product is obtained. The resulting product is dissolved in butyl acetate at 100° C., and an iron panel or strip is dipped into the resulting solution. The iron panel is removed almost immediately from this solution, is allowed to air dry for 15 minutes, and subsequently is baked at 160° C. for 45 minutes. A thin coating is observed on that portion of the dipped iron panel. The resulting coating on the panel is hard and tough. The coating displays excellent adhesion to the panel.

EXAMPLE 33

2,3-bis(2,3-epoxypropoxy)-1,4-dioxane and dehydrated castor oil acid are admixed in amounts so as to provide 0.5 carboxy group of said acid per epoxy group of the diepoxide. The resulting admixture is heated for 4.0 hours at 200° C. to give a viscous product mixture which contains residual of free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a solution which contains 77 weight percent solids. The temperature of the resulting admixture then is brought to about 50° to 60° C. An amount of stannic chloride (0.4 weight percent, based on the weight of said viscous product mixture) contained as a solution in ethyl acetate is added dropwise to said admixture over a period of approximately one hour. As the polymerization continues, sufficient xylene is added thereto to facilitate stirring. The solids content of the resulting solution is about 58 weight percent. To the resulting high molecular weight polymeric product mixture (varnish), an iron panel is dipped therein and removed immediately. The resulting coated panel is air-dried for 15 minutes plus baking at 150° C. for 45 minutes. The coated panel resistance to boiling water (one hour) is excellent.

EXAMPLE 34

2,5 - bis(2 - (4 - oxatetratracyclo[6.2.1.0$^{2,7}$.0$^{3,5}$]undec-9-yloxy)ethoxy)-1,4-dioxane and soybean oil acid are admixed in amounts so as to provide 0.6 carboxy group of said acid per epoxy group of the diepoxide. The resulting admixture then is heated for 4 hours at 190° C. to give a viscous product mixture which contains residual or free epoxy groups and hydroxy groups. This viscous product mixture subsequently is charged to a round-bottomed flask which is fitted with an air stirrer, nitrogen purge line, thermometer, and dropping funnel. Sufficient xylene solvent is added to give a solution which contains 75 weight percent solids. The temperature of the resulting admixture then is brought to about 60° C. An amount of boron trifluoridediethyl ether complex (0.2 weight percent of boron trifluoride, based on the weight of said viscous product mixture) contained in excess diethyl ether is added dropwise to said mixture over a period of approximately 40 minutes. As the polymerization continues, sufficient xylene is added thereto to facilitate stirring. The solids content of the resulting solution is about 55 weight percent. To the resulting high molecular weight polymeric product mixture (varnish), an iron panel is dipped therein and removed immediately. The resulting coated panel is air-dried for 20 minutes plus baking at 160° C. for 40 minutes. The coated panel resistance to boiling water (one hour) is excellent.

EXAMPLES 35–41

Several formulations were prepared from 2,3-bis(2,3-epoxypropoxy)-1,4-dioxane and different hardeners. These formulations were then cured and the resulting solid products examined. The pertinent data is set forth in Table I infra.

*Table I*

RESINS FROM 2,3-BIS(2,3-EPOXYPROPOXY)-1,4-DIOXANE [a]

| Example No. | Hardener | Grams | Ratio [b] | Gel Time, Hrs., ° C. | Cure Hrs., ° C. | Resin Description [d] |
|---|---|---|---|---|---|---|
| 36 | Diethylenetriamine | 0.22 | 1.0 | 2.5 hrs. at 20° | 4 hrs. at 120° / 6 hrs. at 160° | Tough, Barcol, 39. |
| 37 | Methylenedianiline | 0.5 | 1.0 | 2.5 hrs. at 50°–75° | 2 hrs. at 50°–75° / 6 hrs. at 160° | Tough, Barcol, 38. |
| 38 | Phthalic anhydride / Ethylene glycol | 0.93 / 0.04 | 1.5 / 0.15 | 6 hrs. at 120° / 1 hr. at 160° | 6 hrs. at 120° / 6 hrs. at 160° | Tough, Barcol, 45. |
| 39 | KOH | [c] 0.03 | | 4 hrs. at 120° | 6 hrs. at 120° / 6 hrs. at 160° | Tough, Barcol, 30. |
| 40 | BF$_3$-monoethylamine | 0.05 | | 2 hrs. at 50°–75° / 3 hrs. at 120° | 2 hrs. at 50°–75° / 5 hrs. at 120° / 6 hrs. at 160° | Tough, Barcol, 50. |
| 41 | 1,2,6-hexanetriol / KOH | [c] 0.22 / 0.03 | 0.5 | 0.75 hr. at 120° | 2.25 hrs. at 120° / 6 hrs. at 160° | Tough, Barcol, 30. |
| 42 | Bisphenol A / KOH | 0.57 / 0.03 | 0.5 | 0.75 hr. at 120° | 2.25 hrs. at 120° / 6 hrs. at 160° | Tough, Barcol, 40. |

[a] 1.2 Grams of 2,3-bis(2,3-epoxypropoxy)-1,4-dioxane employed in all Examples.
[b] Ratio of reactive groups per epoxy group.
[c] Weight of a 17 weight percent solution in ethylene glycol.
[d] Barcol Impressor GYZJ-934-1.

EXAMPLE 42

To a reaction vessel which contains 2,5-bis(2-butenyloxy)-1,4-dioxane (0.500 mole) maintained about 50° C. with stirring, there is added, dropwise, 334.4 grams of a 25 weight percent solution of peracetic acid in ethyl acetate over a period of 4 hours. After an additional 4.5 hours at about 55° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,5-bis(2,3-epoxybutoxy)-1,4-dioxane by inspection of its infrared absorption spectrum and by analysis for oxirane oxygen.

EXAMPLE 43

To a reaction vessel which contains 2,5-bis(2-methylallyloxy)-1,4-dioxane (0.500 mole) maintained about 45° C. with stirring, there is added, dropwise, 334.4 grams of a 25 weight percent solution of peracetic acid in ethyl acetate over a period of 3.5 hours. After an additional 4 hours at about 50° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 2,5-bis(2-methyl-2,3-epoxypropoxy)-1,4-dioxane by inspection of its infrared absorption spectrum and by analysis for oxirane oxygen.

Reasonable variations and modifications of the invention can be made or carried out in the light of the above disclosure without departing from the spirit and scope thereof.

What is claimed is:

1. A diepoxide of the formula

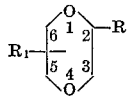

wherein R and $R_1$ are of the group consisting of
  (a) vic-epoxyalkoxy having up to 18 carbon atoms and in which the vic-epoxy group is at least one carbon atom removed from the oxy group thereof,
  (b) vic-epoxycycloalkoxy having from 5 to 7 carbon atoms in the cycloaliphatic nucleus and in which the vic-epoxy group is at least one carbon atom removed from the oxy group thereof,
  (c) vic-epoxycycloalkylalkoxy having from 5 to 7 carbon atoms in the cycloaliphatic nucleus and from 1 to 6 carbon atoms in the alkoxy moiety thereof,
  (d) 3-oxatricyclo[3.2.1.0$^{2,4}$]oct-6-oxy,
  (e) 3-oxatricyclo[3.2.1.0$^{2,4}$]oct-6-ylalkoxy having from 1 to 6 carbon atoms in the alkoxy moiety thereof,
  (f) 4-oxatetracyclo[6.2.1.0$^{2,7}$.0$^{3,5}$]undec-9-oxy,
  (g) 4-oxatetracyclo[6.2.1.0$^{2,7}$.0$^{3,5}$]undec-9-oxyalkoxy having from 2 to 6 carbon atoms in the alkoxy moiety thereof,
  (h) 10-oxapentacyclo[6.3.1.1$^{3,6}$.0$^{2,7}$.0$^{9,11}$]tridec-4-oxy,
  (i) 10-oxapentacyclo[6.3.1.1$^{3,6}$.0$^{2,7}$.0$^{9,11}$]tridec-4-oxyalkoxy having from 2 to 6 carbon atoms in the alkoxy moiety thereof, and
  (j) 10-oxapentacyclo[6.3.1.1$^{3,6}$.0$^{2,7}$.0$^{9,11}$]tridec-4-ylalkoxy having from 1 to 6 carbon atoms in the alkoxy moiety thereof, with the proviso that the $R_1$ variable cannot be bonded to the carbon atoms in the six position of the 1,4-dioxane nucleus.

2. 2,3(5)-bis(vic-epoxyalkoxy)-1,4-dioxane in which each vic-epoxyalkoxy moiety has up to 18 carbon atoms and in which the vic-epoxy group is at least one carbon atom removed from the oxy group of the vic-epoxyalkoxy moiety.

3. 2,3(5)-bis(vic-epoxycycloalkoxy)-1,4-dioxane which contains from 5 to 7 carbon atoms in the cycloaliphatic nucleus and in which the vic-epoxy group is at least one carbon atom removed from the oxy group of the vic-epoxycycloalkoxy moiety.

4. 2,3(5) - bis(vic-epoxycycloalkylalkoxy)-1,4-dioxane which contains from 5 to 7 carbon atoms in the cycloaliphatic nucleus and in which each alkoxy moiety thereof has from 1 to 6 carbon atoms.

5. 2,3 - bis(3 - oxatricyclo[3.2.1.0$^{2,4}$]oct - 6 - oxy)-1,4-dioxane.

6. 2,3(5) - bis(3-oxatricyclo[3.2.1.0$^{2,4}$]oct-6-ylalkoxy)-1,4-dioxane wherein each alkoxy moiety thereof has from 1 to 6 carbon atoms.

7. 2,3-bis(4-oxatetracyclo[6.2.1.0$^{2,7}$.0$^{3,5}$]undec-9-oxy)-1,4-dioxane.

8. 2,3(5) - bis(4 - oxatetracyclo[6.2.1.0$^{2,7}$.0$^{3,5}$]undec-9-oxyalkoxy)-1,4-dioxane wherein each alkoxy moiety thereof has from 2 to 6 carbon atoms.

9. 2,3 - bis(10-oxapentacyclo[6.3.1.1$^{3,6}$.0$^{2,7}$.0$^{9,11}$]tridec-4-oxy)-1,4-dioxane.

10. 2,3(5)-bis(10-oxapentacyclo[6.3.1.1$^{3,6}$.0$^{2,7}$.0$^{9,11}$]tridec-4-oxyalkoxy)-1,4-dioxane wherein each alkoxy moiety thereof has from 2 to 6 carbon atoms.

11. 2,3(5)-bis(10-oxapentacyclo[6.3.1.1$^{3,6}$.0$^{2,7}$.0$^{9,11}$]tridec-4-ylalkoxy)-1,4-dioxane wherein each alkoxy moiety thereof has from 1 to 6 carbon atoms.

12. 2,3-bis(2,3-epoxypropoxy)-1,4-dioxane.

13. 2,3-bis(2,3-epoxybutoxy)-1,4-dioxane.

14. 2,3-bis(2-methyl-2,3-epoxypropoxy)-1,4-dioxane.

References Cited by the Examiner

UNITED STATES PATENTS

| | | | |
|---|---|---|---|
| 2,848,426 | 8/1958 | Hewey | 260—348 |
| 2,870,101 | 1/1959 | Stewart | 260—2 |
| 2,914,490 | 11/1959 | Wheelock | 260—2 |
| 2,917,469 | 12/1959 | Phillips et al. | 260—2 |
| 2,955,116 | 10/1960 | Diveley | 260—340.6 |
| 2,974,149 | 3/1961 | Schmerling | 260—340.6 |
| 2,994,706 | 8/1961 | Rosen | 260—340.6 |
| 3,010,973 | 11/1961 | Hirsch et al. | 260—340.6 |

OTHER REFERENCES

Bergmann: "The Chemistry of Acetylene and Related Compounds," p. 80 (1948).

Wheland: "Advanced Organic Chemistry," 2nd ed., p. 373 (1949).

WALTER A. MODANCE, *Primary Examiner.*

H. N. BURSTEIN, NICHOLAS RIZZO, *Examiners.*